(12) United States Patent
Hoffman

(10) Patent No.: US 11,154,802 B2
(45) Date of Patent: Oct. 26, 2021

(54) INFLATOR FILTER FOR AN INFLATABLE AIRBAG SYSTEM

(71) Applicant: Autoliv ASP, Inc., Ogden, UT (US)

(72) Inventor: Isaac Hoffman, Kaysville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 152 days.

(21) Appl. No.: 16/523,503

(22) Filed: Jul. 26, 2019

(65) Prior Publication Data
US 2021/0023487 A1    Jan. 28, 2021

(51) Int. Cl.
*B01D 46/24* (2006.01)
*B60R 21/26* (2011.01)
*B01D 39/12* (2006.01)
*B60R 21/264* (2006.01)

(52) U.S. Cl.
CPC ......... *B01D 39/12* (2013.01); *B01D 46/2403* (2013.01); *B60R 21/264* (2013.01); *B01D 2279/10* (2013.01); *B60R 2021/26011* (2013.01)

(58) Field of Classification Search
CPC .............. B01D 39/12; B01D 46/2403; B01D 2279/10; B01D 2021/26011; B01D 46/10; B01D 29/0022; B01D 29/0054; B01D 29/0059; B01D 29/56; B01D 29/58; B01D 39/10; B01D 46/0023; B01D 2275/105; B01D 2275/50; B60R 21/264; B60R 21/2644
See application file for complete search history.

(56) References Cited

U.S. PATENT DOCUMENTS

| 2,063,743 | A | * | 12/1936 | Kamrath | ............ | B01D 46/0043 |
| | | | | | | 55/524 |
| 5,985,060 | A | * | 11/1999 | Cabrera | ............ | C06D 5/06 |
| | | | | | | 149/62 |
| 6,065,774 | A | | 5/2000 | Cabrera | | |
| 2006/0103122 | A1 | | 5/2006 | McFarland | | |
| 2008/0150260 | A1 | * | 6/2008 | Whang | ............ | B60R 21/2644 |
| | | | | | | 280/728.1 |
| 2009/0184504 | A1 | | 7/2009 | Greenwood et al. | | |
| 2009/0295132 | A1 | | 12/2009 | Jackson et al. | | |

(Continued)

FOREIGN PATENT DOCUMENTS

| CN | 108704403 | | 10/2018 |
| KR | 100455331 | B1 * | 11/2004 |
| KR | 20150021778 | A * | 3/2015 |

(Continued)

OTHER PUBLICATIONS

International Search Report and Written Opinion dated Aug. 20, 2020 for international application PCT/US2020/033794.

*Primary Examiner* — Paul N Dickson
*Assistant Examiner* — Maxwell L Meshaka
(74) *Attorney, Agent, or Firm* — Stoel Rives LLP

(57) ABSTRACT

Systems and methods are disclosed for an expanded metal filter for use with an automotive safety device, such an inflatable airbag system. The expanded metal filter is composed of a plurality of expanded metal layers, wherein when a first expanded metal layer is turned over or inverted the peaks of the first expanded metal layer conform to valleys of a second expanded metal layer, and valleys of the first expanded metal layer conform to peaks of the first expanded layer whereby the first and second expanded layers nest together.

20 Claims, 8 Drawing Sheets

(56) References Cited

U.S. PATENT DOCUMENTS

2010/0006492 A1* 1/2010 Schulz .................... B29C 48/70
                                                      210/225
2018/0229687 A1* 8/2018 Adamczyk ............. B01D 39/12

FOREIGN PATENT DOCUMENTS

| WO | 1999006248 | 2/1999 |
| WO | 2018039116 | 3/2018 |
| WO | 2018151893 | 8/2018 |

* cited by examiner

INFLATOR FILTER FOR AN INFLATABLE AIRBAG SYSTEM

TECHNICAL FIELD

The present disclosure relates generally to the field of automotive protective systems. More specifically, the present disclosure relates to inflator filters of airbag systems that are configured to deploy in response to collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not to be considered limiting of the scope of the disclosure, the embodiments will be described and explained with specificity and detail in reference to the accompanying drawings.

DETAILED DESCRIPTION

Figure 1A:
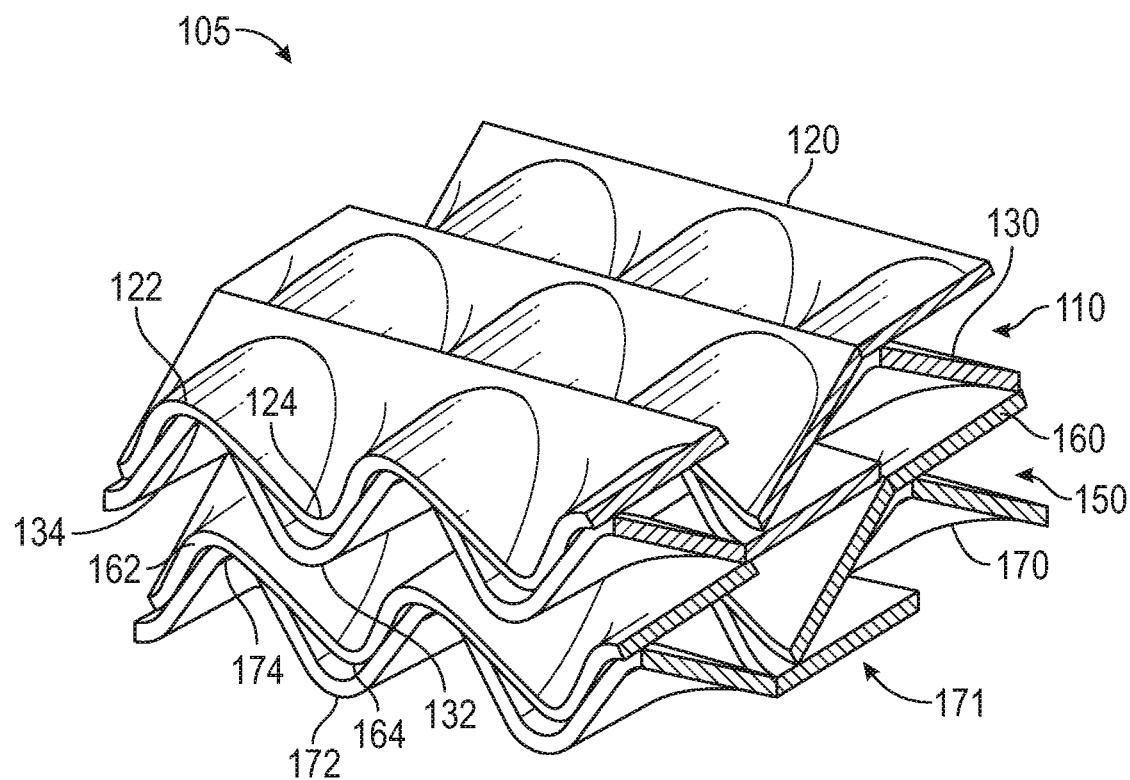
FIG. 1A is a perspective view of a portion of a filter for an inflator of an inflatable airbag system, according to an embodiment of the present disclosure.

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Automotive safety devices, such as inflatable airbag assemblies, are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position.

During installation, inflatable airbag systems are typically disposed at an interior of a housing in a packaged state (e.g., are rolled, folded, and/or otherwise compressed) or a compact configuration and may be retained in the packaged state behind a cover. During a collision event, an inflator is initiated or otherwise triggered, which rapidly fills the airbag with inflation gas. The airbag can rapidly transition from a packaged state (e.g., a compact configuration) to a deployed state or an expanded configuration. The inflator may be triggered by an initiator that may be triggered by any suitable device or system, and the triggering may be in response to and/or influenced by one or more vehicle sensors.

In addition to an initiator, the inflator comprises a chemical reactant (pyrotechnic material) for producing a quantity of gas during deployment, and a filter. The pyrotechnic material may be in the form of compacted pellets in a reaction vessel. When the initiator is triggered, the initiator initiates a chemical reaction at the pyrotechnic material. The chemical reaction may be a combustion process that produces heat, gas (usually, an inert gas), and post-reaction byproduct (such as cupric residue). The gas expands rapidly and the gas may be forced through the filter and a plurality of ports to exit the reaction vessel to be directed into one or more inflatable airbags, whereby the one or more inflatable airbags may rapidly expand, deploying from a housing.

The expanding gas may be influenced by both thermodynamics and fluid dynamics, including aerodynamics. Furthermore, the chemical reaction proceeds rapidly, whereby incompletely combusted pyrotechnic particles ("ICPP") that may be carried by the gas enroute from the intended point of reaction toward the inflatable airbag(s). Additionally, post-reaction byproducts ("PRB") may be entrained with the gas. The filter is imposed between the pyrotechnic material and the exit ports of the reaction vessel to reduce and/or eliminate the quantity and/or volume of ICPP and/or PRB exiting the inflator and entering the inflatable airbag(s).

The filter of an airbag inflator necessarily has both mass and volume, affecting an overall mass and volume of an inflatable airbag system, which can affect installation of an inflatable airbag system to a vehicle. Reducing an overall volume and/or mass of a filter is desirable to minimize impact of the overall size and weight of the inflatable airbag system. Improving the degree to which a filter inhibits the transport of ICPP and PRB from the reaction vessel toward the inflatable airbag(s) may have a number of desirable effects. For example, the filter may: prevent combustion of ICPP at a surface of an inflatable airbag, causing improper performance of the inflatable airbag; reduce the possibility of a burn injury to an occupant of a vehicle by ICPP or PRB; and improve the overall rate of combustion by retaining ICPP close to a primary point of reaction whereby the ICPP may be caused to react and thereby improve the overall efficiency of the reactant conversion to gas to inflate the inflatable airbag(s).

As used herein, the term nest (and relatedly the terms nests, nesting, and nested) refers to positioning adjacent to one another two or more components having corresponding matching (e.g., mating) physical features such that the matching physical features of one component fit within, close together with, or compactly with features of a second component, whereby the two or more components may be positioned closer to each other than may otherwise be possible were the features of the one component to not nest with the features of the second component.

FIG. 1A is a perspective view of a portion of a filter 105, according to one embodiment of the present disclosure. The filter 105 may comprise a plurality of sheets (or layers). The plurality of layers may be expanded metal. However, the present disclosure is not so limited and the plurality of sheets may be fabricated from a variety of materials, e.g., carbon steel, galvanized steel, stainless steel, and alloys (involving one or more of, e.g., aluminum, copper, titanium, etc.), and the like. In some embodiments, ceramic materials and can also perform appropriately for the purposes of the embodiments of this disclosure, hence the present disclosure encompasses such ceramics for use in place of expanded metal. For ease of description, the layers throughout the specification will be described as expanded metal, but the layers are not limited expanded metal.

The filter 105 may be a component of an automotive safety device, such as an inflatable airbag system. The filter 105 may comprise a plurality of layers that are nested together. The filter 105 may comprise two or more layers. For ease of description, the layers are described in pairs, e.g., a first layer that nests with a second layer, forming a pair of layers. A pair of layers may nest with another layer (e.g., a third layer), to form a second pair of layers (e.g., the second layer paired with the third layer). In the illustrated embodiment of FIG. 1A, the filter 105 comprises at least two nested layer pairs 110, 150. In some embodiments, the filter 105 may comprise a third pair of nested layers, such as may be formed by nesting of the pair of layers formed by the second layer 130 and the third layer 160. In some embodiments, the second layer 130 may not nest with the third layer 160.

The first nested layer pair 110 comprises a first expanded metal layer 120 and a second expanded metal layer 130. The first expanded metal layer 120 comprises a series of projections that form a plurality of peaks and valleys. For reference, a major plane of one layer (a fourth layer 170) is illustrated. The major plane may be defined as passing through a planar center of the stock from which the fourth expanded metal layer 170 is formed. Geometry of the major plane is not affected by a process of converting stock material to the fourth expanded metal layer 170. The expanded metal layers 120, 130, 160 each have a major plane parallel to the major plane in FIG. 1A.

Each projection defines an intentional deformation from the major plane of the particular expanded metal layer 120, 130, 160, 170. As viewed in FIG. 1A, a projection defines a representative valley 124, and a pair of neighboring projections define a representative peak 122. The peak 122 and the valley 124 are representative examples of the series of projections of the first expanded metal layer 120. The second expanded metal layer 130 likewise comprises a series of projections of which a valley 132 and a peak 134 are representative examples. The terms "peak" and "valley" are based on a viewing perspective of the layer relative to the projections of that layer. In other words, in a first orientation of the layer, a projection may be a peak (rising upward from a principle plane of the layer), and, when turned over, the same feature appears as a valley. The projections of the first expanded metal layer 120 and the projections of the second expanded metal layer 130 enable the first expanded metal layer 120 and the second expanded metal layer 130 to nest together. This is also true when one layer is turned over, whereby the peaks of the particular layer become valleys that may nest with valleys of the companion layer wherein the nested peaks and valleys form angled features that may be particularly suitable for a filter application.

In FIG. 1A, first expanded metal layer 120 has been turned over or inverted relative to a principle plane of both expanded metal layers 120, 130, and disposed adjacent the second expanded metal layer 130. The peak 122 of the first expanded metal layer 120 is nested with the peak 134 of the second expanded metal layer 130, and the valley 124 of the first expanded metal layer 120 is nested with the valley 132 of the second expanded metal layer 130. The nesting of the peaks 122 and 134 and valleys 124 and 132 are representative of nesting of other (potentially all) projections of the first and second expanded metal layers 120, 130, whereby forming the first layer pair 110.

The second layer pair 150 similarly comprises a third expanded metal layer 160 and a fourth expanded metal layer 170. The third and fourth expanded metal layers 160, 170 are similarly nested to form the second layer pair 150. In other words, a representative peak 162 of the third expanded metal layer 160 nests with a representative peak 174 of the fourth expanded metal layer 170, and a representative valley 164 of the third expanded metal layer 160 nests with a representative valley 172 of the fourth expanded metal layer 170. The nesting of the peaks 162 and 174 and valleys 164 and 172 are representative of nesting of other (potentially all) projections of the third and fourth expanded metal layers 160, 170, whereby forming the second layer pair 150. As noted previously, in some embodiments the first and second layer pairs 110, 150 may also nest with one another (e.g., the second layer 130 may also nest with the third layer 160) to form the filter 105. Additional layers and/or layer pairs may also be included to form the filter 105. Thus, the filter 105 may comprise a plurality of layers and a plurality of layer pairs. Further, the description herein of a layer pair comprising two layers is not intended to foreclose that in some embodiments, an individual layer pair may comprise two or more layers.

Figure 1B:
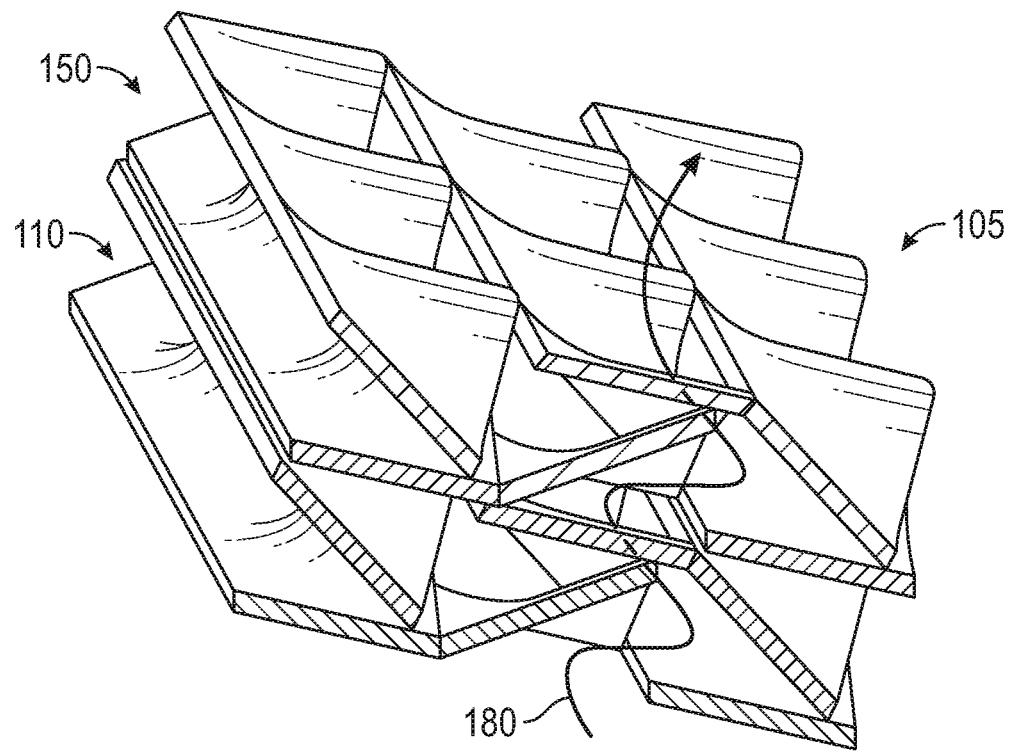
FIG. 1B is a perspective view of a portion of the filter of FIG. 1A inverted indicating a potential gas flow pathway, according to an embodiment of the present disclosure.

FIG. 1B is another perspective view of a portion of the filter 105 of FIG. 1A. The first and second layer pairs 110, 150 are shown, and are composed of, respectively, the first expanded metal layer 120 and the second expanded metal layer 130 and the third expanded metal layer 160 and the fourth expanded metal layer 170.

Placing one expanded metal sheet planarly against another expanded metal sheet may produce a unit of a given thickness wherein the given thickness is approximately three times the projection deformation plus two times the thickness of the sheet from which the expanded metal sheets were formed. Furthermore, placing one expanded metal sheet planarly against another expanded metal sheet may yield significant passageways whereby a gas or fluid may transit through the paired expanded metal sheets. In the present disclosure, the first expanded metal layer 120 is rotated 180° about a longitudinal axis (e.g., inverted), whereby the bottom side becomes the top side, and the top side becomes the bottom side. The first expanded metal layer 120 may then be placed planarly against the second expanded metal layer 130 in a bottom-to-bottom or a top-to-top configuration such that the projections described above nest together. When combined in this manner, the thickness of the first layer 110 is approximately two times (the projection deformation plus the thickness of the sheet), which may be approximately two-thirds the previously described thickness. Furthermore, the passageways whereby a gas or fluid may transit through the first layer pair are significantly narrower and significantly more convoluted. An effect of nesting the first and second expanded metal layers 120, 130, in addition to narrow and convoluted pathways, is the formation of relatively sharp, narrow angles within and adjacent such pathways.

A representative pathway 180 whereby gas or fluid may travel through the filter 105 is shown. However, the filter 105 may comprise a plurality of different pathways to allow gas to escape from the filter 105 as quickly as possible. The representative pathway 180 includes numerous radiused turns ranging from about 45° to about 90° within the narrow confines of the combined two layer pairs 110, 150. In some embodiments, turns may range from about 30° to about 150°. Such turns of the representative pathway 180 may occur relative to longitudinal, vertical, and lateral axes of the filter 105. In other words, the representative pathway 180 may be highly convoluted and/or tortuous. The representative pathway 180 is but one possible pathway for egress of expanding gas from the pyrotechnic conversion of a reactant, and may be a simplest, least convoluted pathway available through the filter 105.

Figure 1C:
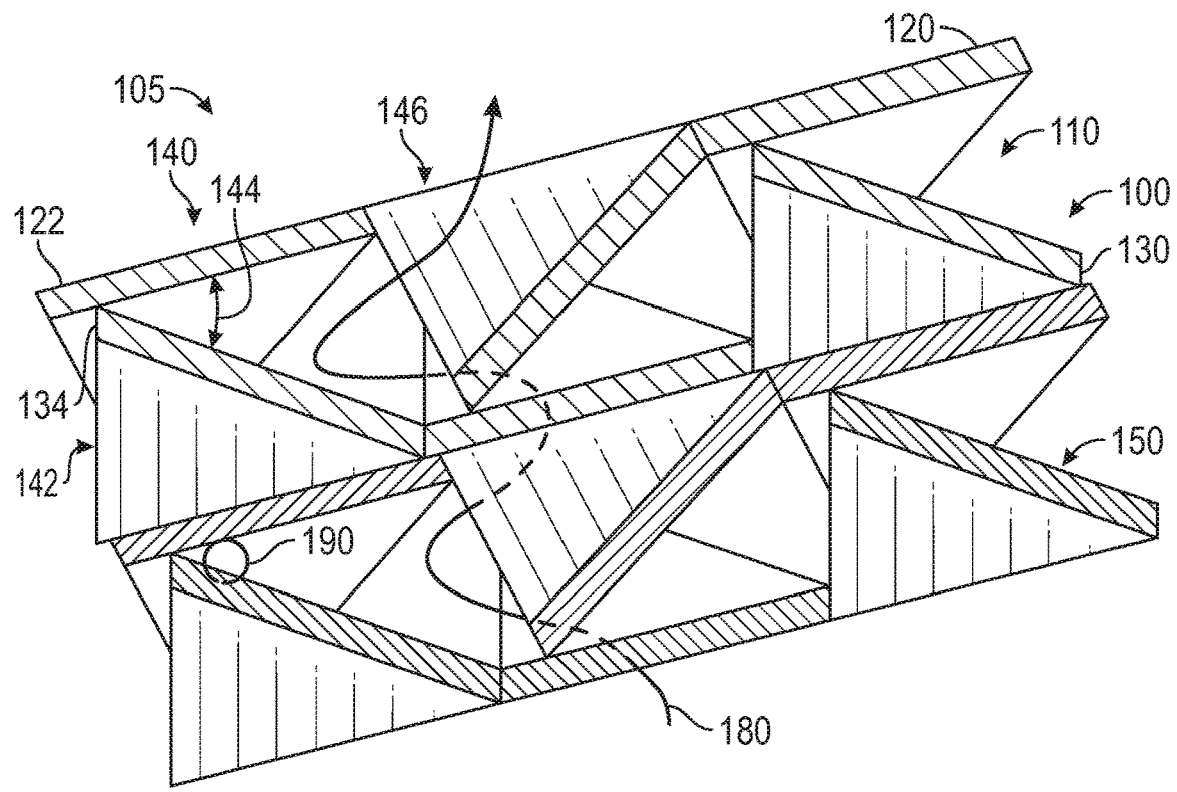
FIG. 1C is a side cross sectional view of a portion of the filter of FIGS. 1A and 1B indicating the potential gas flow pathway.

FIG. 1C is a side cross sectional view of a portion of the filter 105 of FIG. 1A, according to an embodiment of the present disclosure. The first and second layer pairs 110, 150 are shown. The peak 122 of the first expanded metal layer 120, and the peak 134 of the second expanded metal layer 130 are shown nested together and in a first row 140. With the peaks 122, 134 nested together, an aperture 142 and an internal angle 144 opposite the aperture 142 are formed. The aperture 142 is representative of apertures formed at each location where peaks or valleys nest together. The internal angle 144 is acute toward a midline between two apertures of an adjacent row 146 and is representative of internal angles formed opposite the apertures where peaks or valleys nest together. A representative pathway 180 for gases traveling through the filter 105 is shown. The representative pathway 180 of FIG. 1C is not necessarily the same trajectory as the representative path 180 of FIG. 1B. Each pathway, such as the representative pathway 180, may be defined by fluid dynamics as affected by apertures and internal angles, such as the representative aperture 142 and representative internal angle 144. As gases of the pyrotechnic combustion expand rapidly and travel through the filter 105, the gases may transport ICPP and/or PRB along a pathway such as the representative pathway 180. The filter 105 can provide for effective egress of the gas created by the pyrotechnic combustion through the filter 105 to an associated inflatable airbag assembly while inhibiting ICPP and/or PRB from exiting the filter 105, thereby reducing, limiting, or even preventing, the quantity and/or volume of ICPP/PRB entering an inflatable airbag of the associated inflatable airbag assembly.

A particle 190 is shown in FIG. 1C. The particle 190 may represent ICPP or PRB. As is known from relevant principles of fluid dynamics, gases moving along a narrow, convoluted pathway with narrow angles adjacent the pathway are subject to significant variances in pressure. As the particle 190 is transported by the expanding gases into the filter 105, a trajectory of the particle 190 may be affected by inertia of the particle 190 and variances in pressure as the gases travel along a convoluted, tortuous path, such as the representative path 180, through the filter 105. As a desirable result, the particle 190 may become lodged against a portion of the filter 105. If the particle 190 comprises ICPP, the ICPP may combust while lodged against a portion of the filter 105, which is preferable to the ICPP being transported into an inflatable airbag before potentially combusting, or to the ICPP exiting a vent, aperture, or rent of the inflatable airbag. Similarly, if the particle 190 is PRB, it is preferable to capture the PRB at the filter 105 because PRB may retain substantial heat that may cause damage to an inflatable airbag and/or an occupant. Generally, expanding gases of an inflator entrain both ICPP and PRB to the filter. Thus, the filter 105 may reduce passage of both ICPP and PRB to or beyond an associated inflatable airbag.

Figure 2A:
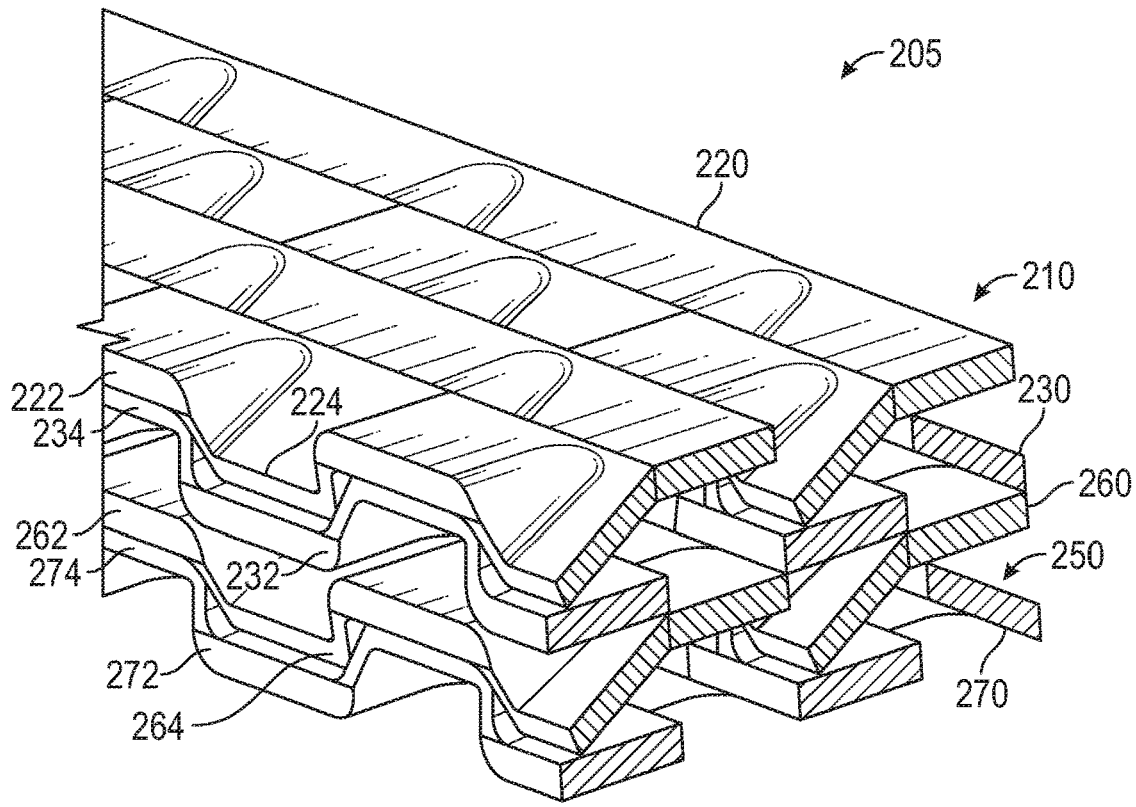
FIG. 2A is a perspective view of a portion of a filter, according to another embodiment of the present disclosure.
Figure 2B:
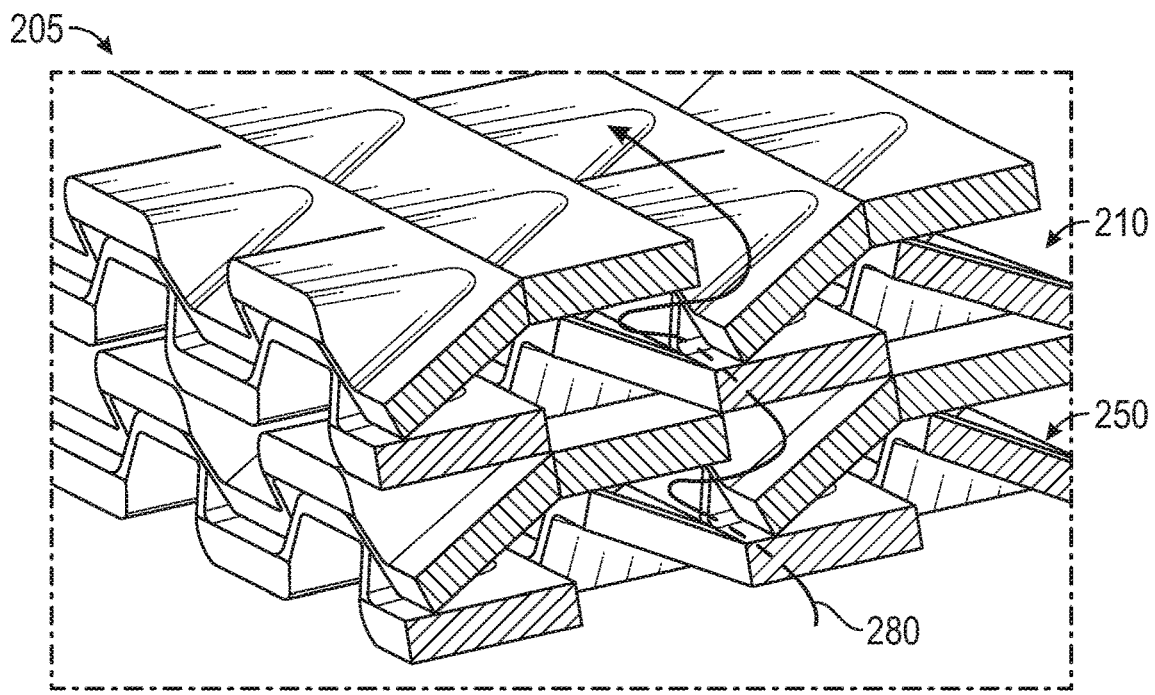
FIG. 2B is a perspective view of a portion of the filter of FIG. 2A indicating a potential gas flow pathway, according to an embodiment of the present disclosure.
Figure 2C:
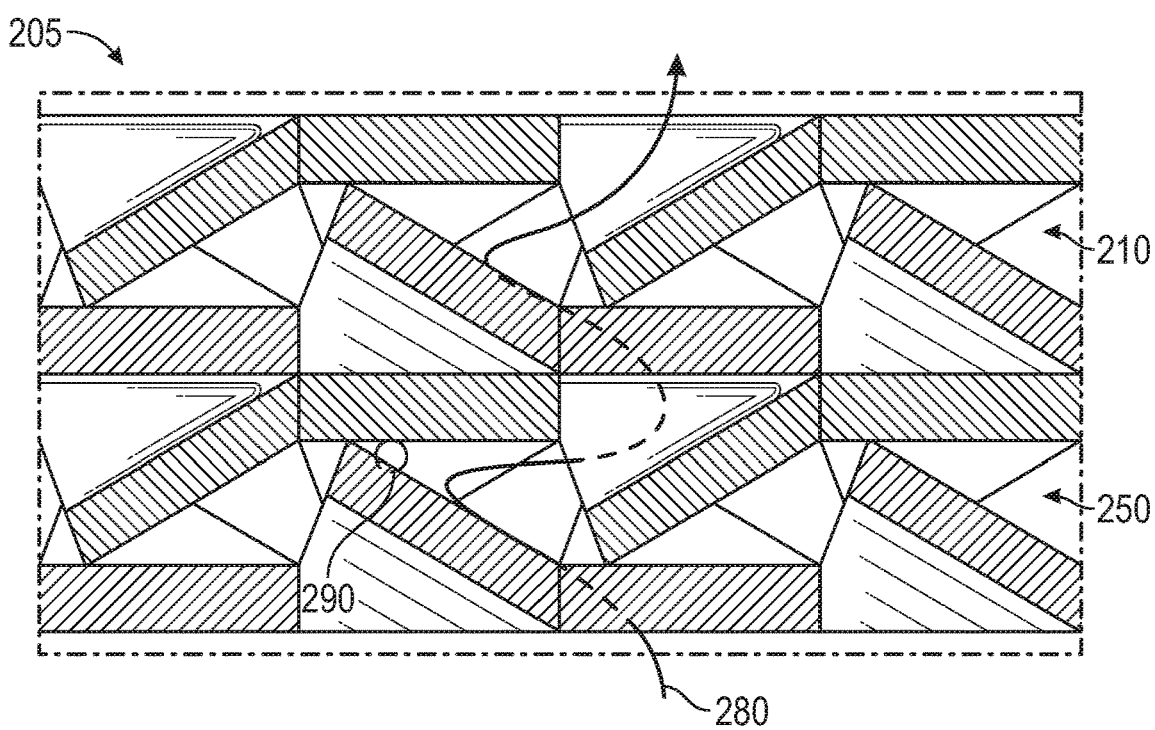
FIG. 2C is a side cross sectional view of a portion of the filter of FIGS. 2A and 2B indicating the potential gas flow pathway.

FIGS. 2A-2C depict another embodiment of a filter 205 that resembles the filter 105 described above in certain respects. Accordingly, like features are designated with like reference numerals, with the leading digits incremented to "2." For example, the embodiment depicted in FIGS. 2A-2C includes a first layer pair 210 that may, in some respects, resemble the first layer pair 110 of FIGS. 1A-1C. Relevant disclosure set forth above regarding similarly identified features thus may not be repeated hereafter. Moreover, specific features of the first layer pair 110 and related components shown in FIGS. 1A-1C may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the filter 205 and related components depicted in FIGS. 2A-2C. Any suitable combination of the features, and variations of the same, described with respect to the filter 105 and related components illustrated in FIGS. 1A-1C can be employed with the filter 205 and related components of FIGS. 2A-2C, and vice versa. This pattern of disclosure applies equally to further embodiments depicted in subsequent figures and described hereafter, wherein the leading digits may be further incremented.

FIG. 2A is a perspective view of a portion of a filter 205 for an inflatable airbag system, according to another embodiment of the present disclosure. The filter 205 comprises a plurality of nested layer pairs. The filter 205 comprises at least two layer pairs 210, 250. The first layer pair 210 comprises a first expanded metal layer 220 and a second expanded metal layer 230. The first and second expanded metal layers 220, 230 are nested together. The first expanded metal layer 220 comprises a series of projections that form a plurality of peaks and valleys. A peak 222 and a valley 224 are representative examples of the series of projections of the first expanded metal layer 220. The second expanded metal layer 230 likewise comprises a series of projections of which a valley 232 and a peak 234 are representative examples.

The peak 222 of the first expanded metal layer 220 is nested with the peak 234 of the second expanded metal layer 230, and the valley 224 of the first expanded metal layer 220 is nested with the valley 232 of the second expanded metal layer 230. The nesting of the peaks 222 and 234 and valleys 224 and 232 are representative of nesting of other (potentially all) projections of the first expanded metal layer 220 and the second expanded metal layer 230, whereby forming the first layer pair 210.

The second layer pair 250 similarly comprises a third expanded metal layer 260 and a fourth expanded metal layer 270. The third expanded metal layer 260 and the fourth expanded metal layer 270 are similarly nested to form the second layer pair 250. In other words, a representative peak 262 of the third expanded metal layer 260 nests with a representative peak 274 of the fourth expanded metal layer 270, and a representative valley 264 of the third expanded metal layer 260 nests with a representative valley 272 of the fourth expanded metal layer 270. The nesting of the peaks 262 and 274 and valleys 264 and 272 are representative of nesting of other (potentially all) projections of the third and fourth expanded metal layers 220, 230, whereby forming the second layer pair 250. The first layer pair 210 and the second layer pair 250 may be placed adjacent one another to form the filter 205. In some embodiments, the filter 205 may comprise a third pair of layers, such as may be formed by nesting of the pair of layers formed by the second expanded metal layer 230 and the third expanded metal layer 260. In some embodiments, the second expanded metal layer 230 may not nest with the third layer 260. Additional layer pairs may also be included, such that the filter 205 may comprise a plurality of layers and/or a plurality of layer pairs. Further, the description herein of a layer pair comprising two layers is not intended to foreclose that in some embodiments, an individual layer pair may comprise two or more layers.

As may be discernable from the foregoing, the filter 205 is, in many respects, similar to the filter 105 of FIGS. 1A-1C. A principal difference between the filter 105 of FIGS. 1A-1C and the filter 205 of FIG. 2A is the manner of forming each of the expanded metal layers 220, 230, 260, 270. In the former embodiment of FIGS. 1A-1C, the peaks and valleys of the expanded metal layers 120, 130, 160, 170 are somewhat pointed. In the latter embodiment of FIG. 2A, the peaks and valleys of the expanded metal layers 220, 230, 260, 270 have a flat form. Yet other forms or shapes of the peaks and valleys of expended metal layers are within the scope of the disclosure.

FIG. 2B is another perspective view of a portion of the filter 205 of FIG. 2A inverted. The first layer pair 210 and the second layer pair 250 are shown, and are composed of, respectively, the first and second expanded metal layers (220, 230 in FIG. 2A) and the third and fourth expanded metal layers (260, 270 in FIG. 2A).

A representative pathway 280 whereby gas or fluid may egress through the filter 205 is shown. The representative pathway 280 includes numerous turns ranging from about 45° to about 90° within the narrow confines of the combined two layer pairs 210, 250. In some embodiments, turns may range from about 30° to about 150°. Such turns of the representative pathway 280 may occur relative to longitudinal, vertical, and lateral axes of the filter 205. In other words, the representative pathway 280 may be highly convoluted and/or tortuous. The representative pathway 280 is but one possible pathway for passage of expanding gas from the pyrotechnic conversion of a reactant, and may be a simplest, least convoluted pathway available through the filter.

FIG. 2C is a side cross sectional view of a portion of the filter 205 of FIG. 2A according to an embodiment of the present disclosure. The first and second layer pairs 210, 250 are shown. A representative pathway 280 for gases transiting the filter 205 is shown. The representative pathway 280 of FIG. 2C is not necessarily the same trajectory as the representative pathway 280 of FIG. 2B. As gases of the pyrotechnic combustion expand rapidly and pass through the filter 205, the gases may transport ICPP and/or PRB along a pathway such as the representative pathway 280.

A representative particle 290 is shown in FIG. 2C. The particle 190 may become lodged against a portion of the filter 205. The particle 290, if it comprises ICPP, may combust while lodged against a portion of the filter 205, which is preferable to the ICPP being transported into an inflatable airbag before potentially combusting, or of the ICPP exiting a vent, aperture, or rent of the inflatable airbag and potentially combusting. As noted, above, expanding gases of the inflator generally entrain both ICPP and PRB to the filter, and the filter 205 may significantly reduce the amount of ICPP and PRB reaching an associated inflatable airbag or beyond.

Figure 3A:
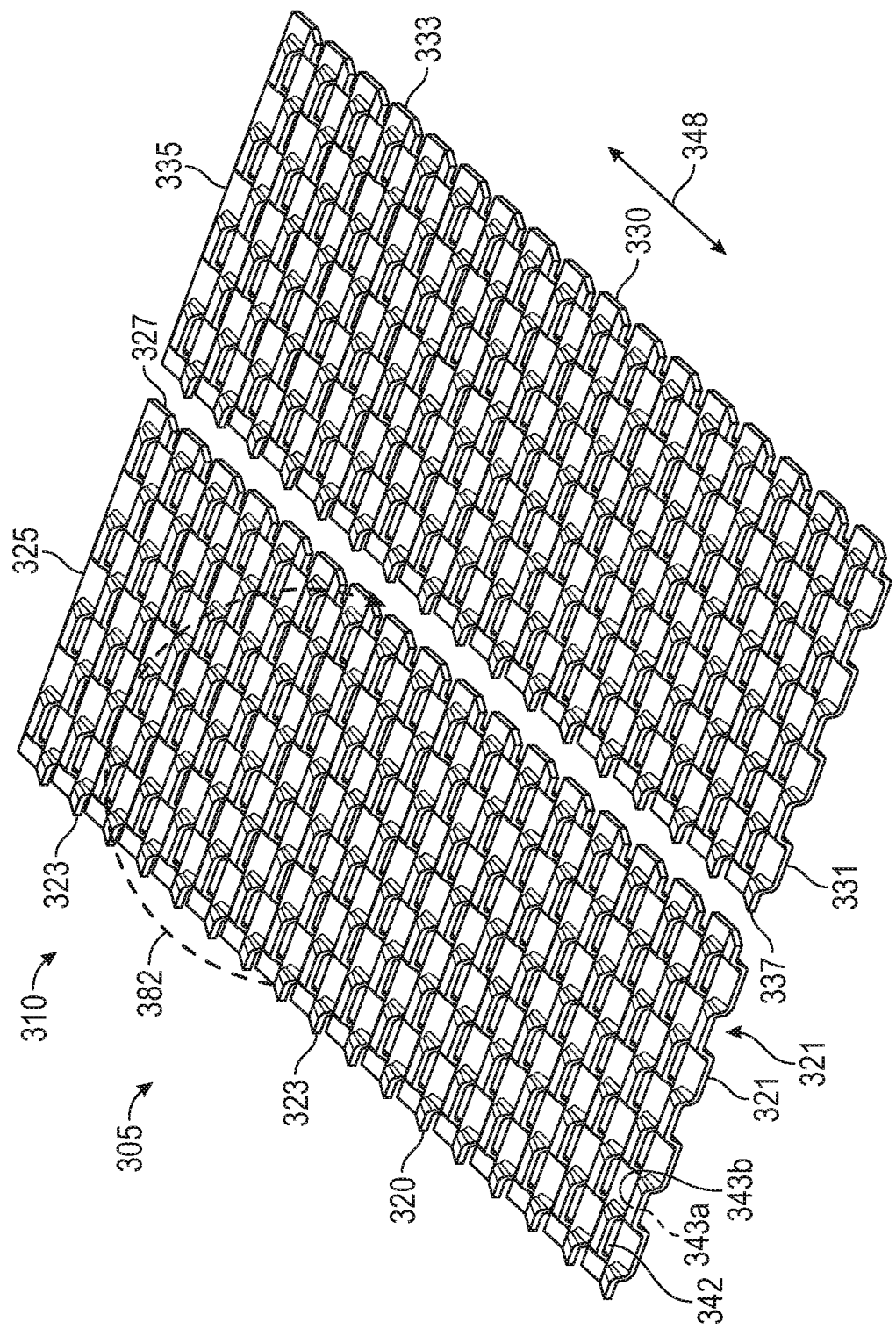
FIG. 3A is a perspective view of a preassembly state of a portion of a filter, according to an embodiment of the present disclosure.

FIG. 3A is a perspective view of a preassembly state of a portion of a filter 305, according to another embodiment of the present disclosure, and which is, in many respects, similar to the filters 105, 205 of FIGS. 1A-2C. A first layer 320 and a second layer 330 are shown side by side. The first layer 320 and the second layer 330 may be expanded metal. During manufacture of an expanded metal layer, such as the layers 320, 330, a first edge of a sheet metal may be fed into an apparatus that may first incise then press the sheet metal to form an expanded metal layer. The incising and pressing may be accomplished in a single apparatus, or in multiple apparatuses.

In FIG. 3A, the first and second expanded metal layers 320, 330 are presented in an identical orientation. That is, a first edge 321 of the first expanded metal layer 320 represents the first edge fed into the apparatus for forming the first expanded metal layer 320. A first edge 331 of the second expanded metal layer 330 similarly represents the first edge fed into the apparatus for forming the second expanded metal layer 330. A second edge 323, a third edge 325, and a fourth edge 327 of the first expanded metal layer 320 are shown. A second edge 333, a third edge 335, and a fourth edge 337 of the second expanded metal layer 330 are also shown. The visible planar side of the first and second expanded metal layers 320, 330 each represents the "up" side of the respective sheet metal as fed into the apparatus to form the first and second expanded metal layers 320, 330.

Each layer may be formed by methods known in the art for the manufacture of expanded metal, or may be formed by appropriate methods using other materials having characteristics of expanded metal. By way of example, a sheet of metal may be pierced at fixed intervals, such as with linear incisions of a fixed length, and then the metal may be pressed against one or more forms whereby the metal is uniformly deformed along each linear incision such that projections conforming to the one or more forms are impressed, consequently resulting in a corresponding aperture through the metal at each incision and projection. Generally, a method of producing expanded metal results in an expanded metal sheet comprising a plurality of projects arranged according a pattern, with each projection defining an aperture. For example, the pattern may be the plurality of projections may be aligned in a plurality of rows and columns. The projections in one row may be offset from the projections in an adjacent row and aligned with the projections in a third row.

Each projection comprises at least two faces 343a, 343b and one of the faces comprises an aperture 342 and is oriented transverse to the major plane of the expanded metal layer. A top face 343a may form an acute angle relative to a major plane of the respective expanded metal layer. In one embodiment, the acute angle is less than 45°. The top face 343a may comprise a plurality of different shapes. For example, the top face 343a may have a smooth curve shape similar to the projections in FIGS. 1A-1C. In other embodiments, the top face 343a may include an angled surface and adjacent side faces, similar to the projections in FIGS. 2A-2C.

In some embodiments, the projections are disposed on one side of the expanded metal layer, similar to the projections disclosed in regard to FIGS. 1A-2C. In other embodiments, the projections may be disposed on both sides of the expanded metal layer, forming a pattern that will enable the projections to nest with similarly manufactured expanded metal layers.

In some embodiments, the projections may be disposed on one side of the expanded metal sheet for a predetermined length and the projections may be disposed on the other side of the expanded metal sheet for a predetermined length, without the projections overlapping. The expanded metal sheet may be rolled and the projections on the one side of the expanded metal sheet nest within the projections on the other side of the expanded metal sheet without inverting the expanded metal sheet to nest the projections. By rolling the expanded metal sheet, a section of the metal sheet having the projections on one side becomes a first layer and a section of the expanded metal sheet having the projections on the other side of the expanded metal sheet becomes a second layer, thus the expanded metal sheet can be rolled to form an expanded metal filter nested pairs of layers. In some embodiments, the rolled expanded metal filter may have a cylindrical shape. As discussed in more detail below, a principle of the Archimedean spiral is applied to determine the proper interval for incising and pressing the peaks and valleys for the one side and the other side such that the projections align to create inverted nested layers forming a filter.

For example, a method of manufacturing a filter may comprise: stamping a sheet of metal to form a first section of projections including a first plurality of projections on a first side of the sheet of metal and to form a second section of projections with a second plurality of projections on a second side of the sheet of metal, each projection defining an aperture; rolling the sheet of metal (a metal layer) to complete a first roll within the first section of projections on the first side and to complete a second roll within the second section of the projections on the second side, wherein the first section of projections in the first roll forms a first layer and the second section of projections in the second roll forms a second layer with the second plurality of projections nesting with the first plurality of projections in an inverted manner. Stated differently, the stamping provides the sheet of metal with a first side comprising a first plurality of projections arranged according to a pattern for a predetermined length and a second side comprising a second plurality of projections arranged according to the pattern for a predetermined length. Each projection of the first plurality of projections and of the second plurality of projections defines an aperture. The projections on the first side do not overlap the projections on the second side. Rolling the expanded metal layer forms a filter cylinder, wherein the projections of the first side nest with the projections of the second side in an inverted fashion. The pattern of stamping may continue such that a third section includes a third plurality of projections on the first side and a fourth section includes a fourth plurality of projections on the second side. Continued rolling of the sheet of metal provides a third layer of the filter formed by the roll of the third section and a fourth layer of the filter formed by the roll of the fourth section. Again, the third plurality of projections nest with the fourth plurality of projections in an inverted fashion. A principle of the Archimedean spiral is applied to determine the proper interval for the pattern of the projections and the length of each section of projections for the one side and the other side such that the projections align to create inverted nested layers of a filter.

The expanded metal layers 320, 330 may each define a plurality of apertures. The number or quantity of apertures and a distance between apertures may be considered along a longitudinal axis 348. The number or quantity of apertures may be measured per inch along the longitudinal axis 348. The number of apertures per inch for the expanded metal layer 320 may differ from the number of apertures per inch for the expanded metal layer 330. In some embodiments, the apertures per inch of an inner layer, such as expanded metal layer 320, is greater than the apertures per inch of an outer layer, such as expanded metal layer 330. For example, apertures per inch of the expanded metal layer 320 and the expanded metal layer 330 may range between 30 and 40 apertures per inch. In some embodiments, the apertures per inch of adjacent layers may differ by one with the apertures per inch of the inner layer being greater than the outer layer. For example, the apertures per inch of the expanded metal layer 320 may be 37 and the apertures per inch of the expanded metal layer 330 may be 36.

The projections thus formed may be referred to as peaks and valleys. The terms peak and valley are for convenience only, as in a typical method of forming expanded metal, a valley may be a mirror of a peak disposed midway between two peaks. Furthermore, when a sheet of expanded metal is turned over (rotated 180° about a longitudinal axis parallel to a longitudinal axis 348) and disposed against a second sheet of expanded metal, the peaks appear as valleys, and valleys appear as peaks, whereby the peaks of the first sheet of expanded metal correspond to and nest with valleys of the second sheet of expanded metal.

After formation of the first and second expanded metal layers 320, 330, the first expanded metal layer 320 may be rotated 180° about a longitudinal axis, or turned over 382, whereby a bottom planar side 312 of the first expanded metal layer 320 faces upward. In another embodiment, rather than to turn over 382 the first expanded metal layer 320, the second expanded metal layer 330 may be turned over. With one, and only one of the expanded metal layers 320, 330 turned over, the expanded metal layers 320, 330 may be assembled to form a first layer pair 310 of the filter 305. A second or subsequent layer pair may be formed in similar fashion.

Figure 3B:
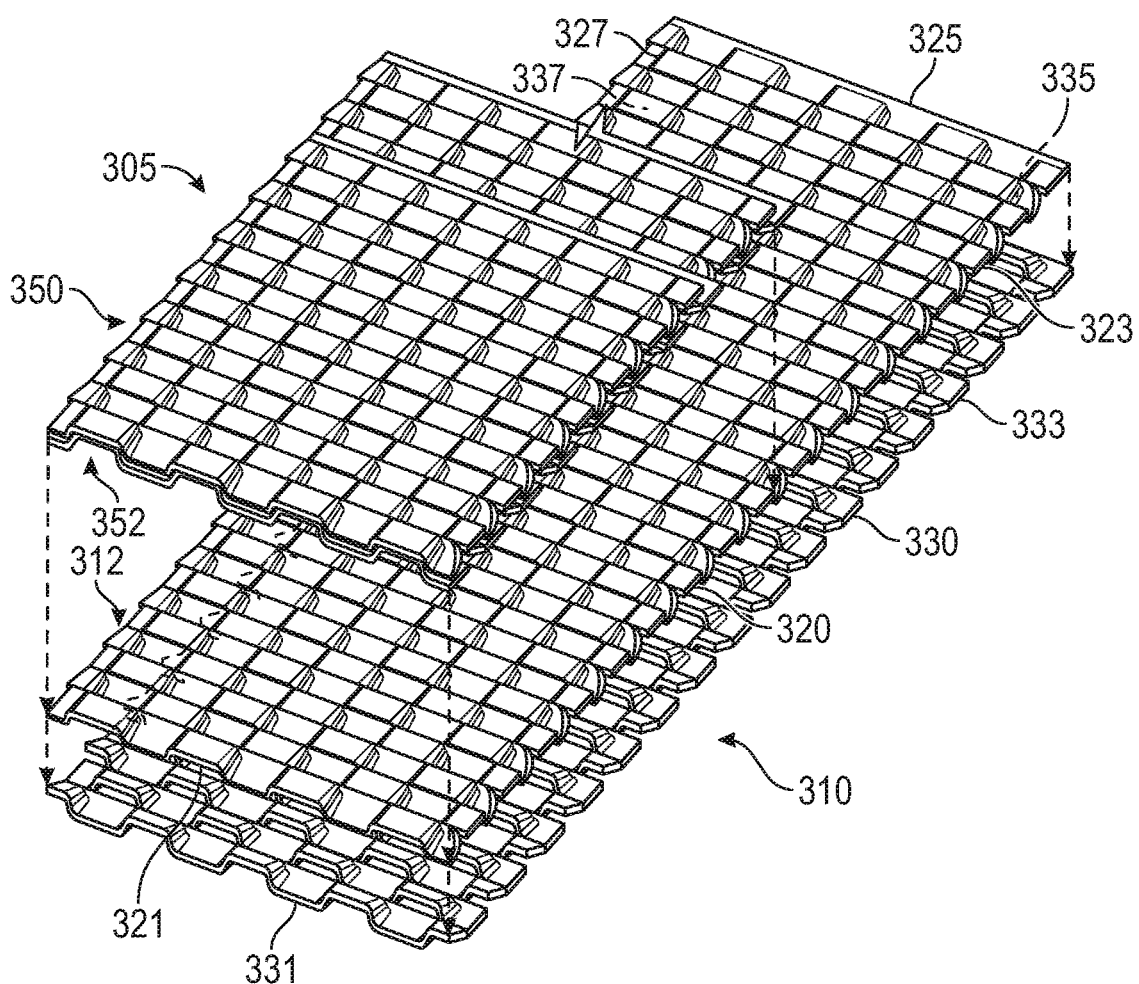
FIG. 3B is a perspective view of another preassembly state of another portion of the filter of FIG. 3A.

FIG. 3B is a perspective view of a portion of the preassembled filter 305 of FIG. 3A, according to an embodiment of the present disclosure. The first expanded metal layer 320 has been turned over as described above and may be assembled to the second expanded metal layer 330. The first expanded metal layer 320 may be lowered onto the second expanded metal layer 330 such that the protrusions may be nested together as described elsewhere herein. The first edge 321 of the first expanded metal layer 320 aligns with, or approximately aligns with the first edge 331 of the second expanded metal layer 330. Similarly, the second edges 323, 333, respectively, of the first and second expanded metal layers 320, 330 may align to each other, the third edges 325, 335 may align to each other, and the fourth edges 327, 337 may align to each other. The edges 321, 331, 323, 333, 325, 335, 327, 337 may not align exactly as the projections align to permit the first and second expanded metal layers 320, 330 to nest together to form the first layer pair 310. With the first layer pair 310 formed, a second layer pair 350 may be mated to the first layer pair 310. Similarly, a subsequent layer pair may be mated to an immediately prior layer pair. With the first and second (and any additional) layer pairs 310, 350 mated, the filter 305 may be formed.

As previously noted, to assemble the first layer pair 310, it is not important whether the first expanded metal layer 320 or the second expanded metal layer 330 is turned over, provided one, and only one, is turned over or inverted. The same is true with regard to assembly of the second layer pair 350 and any subsequent layer pair. When assembling the first layer pair 310 to the second layer pair 350, with respect to how the sheet metal was oriented relative to the cutting/pressing apparatus to form each expanded metal layer 320, 330, 360, 370, the interface between the first and second layer pairs 310, 350 the bottom planar side 312 of the first layer pair 310 to a bottom planar side 352 of the second layer pair 350. In another embodiment the first and second layer pairs 310, 350 may be disposed with top planar sides (not shown, but opposite the bottom planar sides 312, 352) together. In other words, each expanded metal layer 320, 330, 360, 370 has a top planar side and a bottom planar side relative to how each expanded metal layer 320, 330, 360, 370 exited the apparatus forming them. When assembling the filter 305 as shown in FIGS. 3A and 3B, the first expanded metal layer 320 is placed top planar side toward top planar side of the second expanded metal layer 330. The second expanded metal layer 330 is placed bottom planar side toward bottom planar side of the third expanded metal layer 360. The third expanded metal layer 360 is placed top planar side toward top planar side of the fourth expanded metal layer 370. This manner of assemblage is repeated for each subsequent expanded metal layer or layer pair used for the particular filter 305.

As can be appreciated, in other embodiments; the filter 305 can also be formed by adding a single expanded metal layer at a time, and the scope of this disclosure is not limited to adding expanded metal layers successive layers in pairs. In other words, a first nested layer pair may be formed by nesting the first and second expanded metal layers 320, 330 and a second nested layer pair may be formed by nesting a third expanded metal layer 360 together with the second expanded metal layer 330.

Figure 3C:
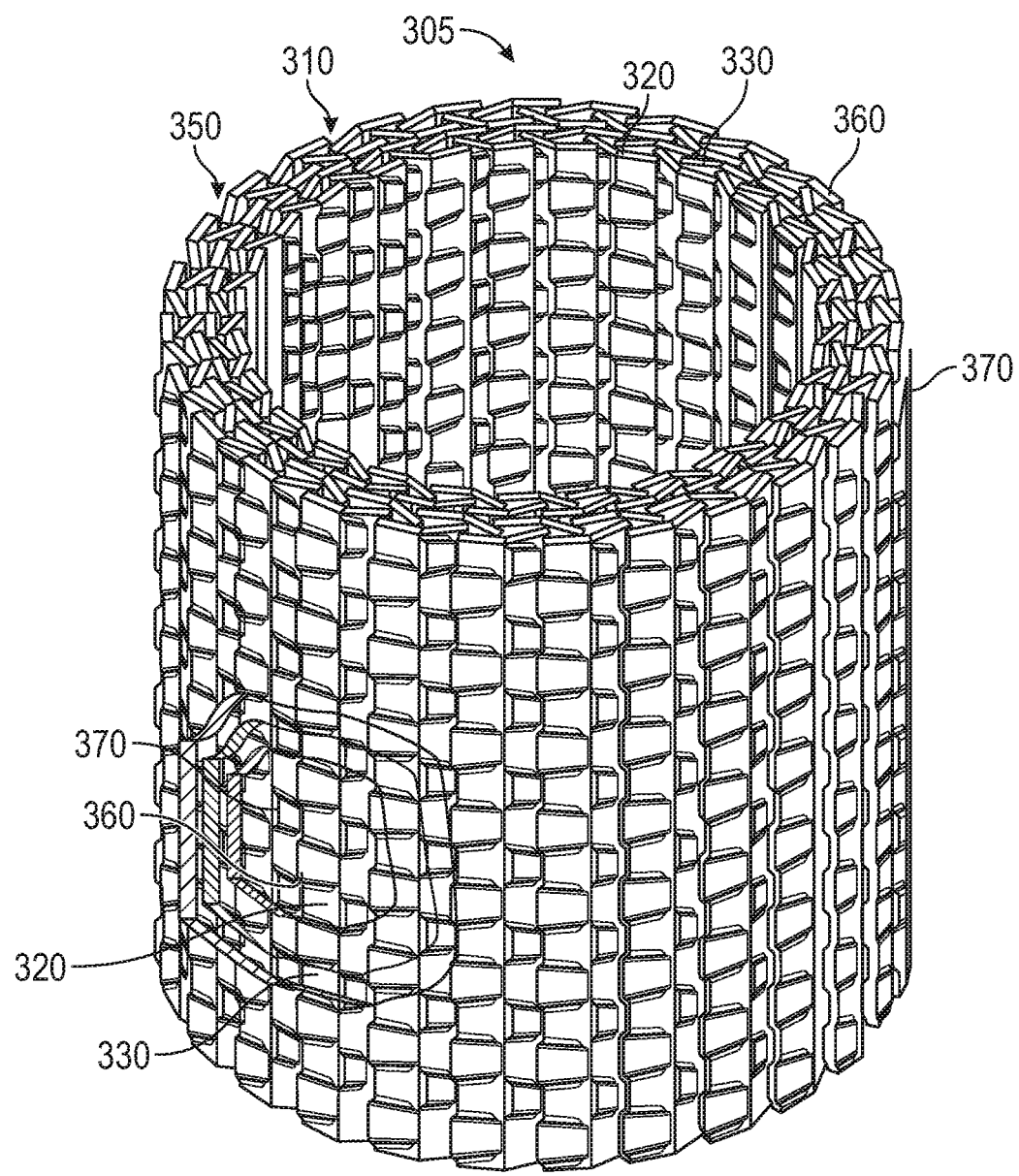
FIG. 3C is a perspective partial sectional view of nested layers of the filter of FIGS. 3A and 3B rolled together.

FIG. 3C is a perspective view of the filter 305 of FIGS. 3A and 3B, according to an embodiment of the present disclosure. With the first and second layer pairs 310, 350 coupled together, the coupled layer pairs 310, 350 may be formed into a cylindrical configuration. A cylindrical configuration of the filter 305 may be particularly suitable for implementation with many airbag inflators.

When the expanded metal layers 320, 330, 360, 370 are formed into a cylinder, each expanded metal layer 320, 330, 360, 370 forms a concentric cylinder with each of the other expanded metal layers 320, 330, 360, 370. The cylinder may be form by rolling a layer pair together, a plurality of layer pairs together, or a plurality of layers together. The concentric cylinder may have differing diameters and differing circumferences. To accommodate the differing circumferences, each successive expanded metal layer 320, 330, 360, 370 is formed having a predetermined length. Furthermore, to ensure proper alignment of projections when the expanded metal layers 320, 330, 360, 370 are configured into a cylinder, a principle of the Archimedean spiral is applied to determine the proper interval for incising and pressing the peaks and valleys into each expanded metal layer 320, 330, 360, 370. In other words, and by way of example without limitation, in an embodiment wherein the first expanded metal layer 320 is disposed to form the innermost cylinder of the filter 310, a first peak nearest the first edge (see 321 in FIGS. 3A, 3B) lies a distance $D_1$ from a last peak nearest the third edge (see 325 in FIGS. 3A, 3B), wherein the first and last peak lie on a line parallel to the second edge (see 323 in FIGS. 3A, 3B). A distance $D_2$, where $D_2=D_1+y_1$, must then lie between a corresponding first peak and last peak of the second expanded metal layer 330 where $y_1$ is the difference (or a function of the difference) in the circumferences of the first and second expanded metal layers 320, 330. Thus, the number of apertures per inch of the first expanded metal layer 320 is greater than the number of apertures per inch of the second expanded metal layer 330. In an embodiment, a distance $D_3$ lies between corresponding first and last peaks of the third expanded metal layer 360 where $D_3=D_2+y_2$ and where $y_2$ is the difference/function of the difference in the circumferences of the second and fourth expanded metal layers 330, 370. (For the example of the present embodiment, the fourth expanded metal layer 370 was inverted and placed atop the third expanded metal layer 360, whereby the second layer pair 350 was formed and the two planar bottoms 312, 352 were disposed adjacent each other, as described in conjunction with FIG. 3B.) This pattern is repeated for each successive expanded metal layer in the particular filter 305. In another embodiment, the Archimedean spiral is applied only to the two expanded metal layers of each layer pair.

The embodiment of FIGS. 3A-3C is one wherein the filter 305 is configured in a circular cylinder. In another embodiment, the filter 305 may be configured in an oval cylinder. In another embodiment, the filter may be configured in a polygon or rounded polygon. In each embodiment, an Archimedean spiral or modified Archimedean spiral calculation can be accounted for to ensure the projections of each successive expanded metal layer nest with the projections of the immediately previous expanded metal layer.

Figure 4A:
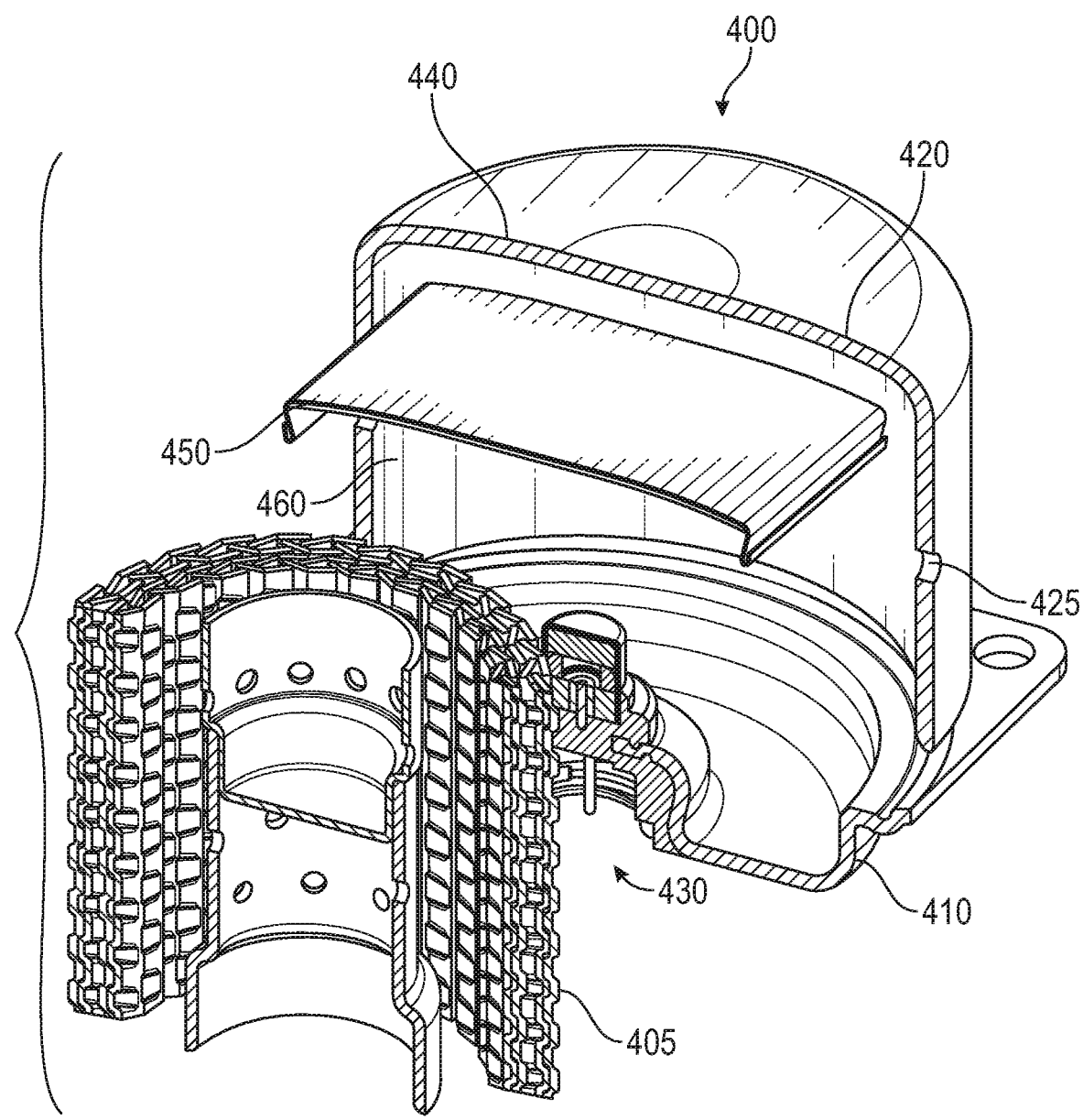
FIG. 4A is a partial exploded perspective view, in cross section, of an inflator of an inflatable airbag system having a filter, according to an embodiment of the present disclosure.

FIG. 4A is a partial exploded perspective view, in cross section, of an inflator 400 of an inflatable airbag system having a filter 405, according to an embodiment of the present disclosure. The inflator 400 comprises a housing 420 that comprises an inflator base 410 and an outer shell 440. The inflator base 410 is shown with an initiator assembly 430 assembled to the inflator base 410. During assembly, the filter 405 is coupled to the inflator base 410. In the illustrated embodiment, the initiator assembly 430 may be coupled to the inflator base 410 before the filter 405. In another embodiment, the initiator assembly 430 may be coupled to the inflator base 410 after the filter 405, or contemporaneously with the filter 405.

Once the initiator assembly 430 and filter 405 are coupled to the inflator base 410, reactant, generally in the form of compressed pellets containing combustible material such as, for example, sodium azide ($NaN_3$), may be added to the inflator 400. An upper closure 450 and the outer shell 440 are then coupled to the inflator 400. A void or reaction chamber 460 is generally defined by the inflator base 410, the initiator assembly 430, and the outer shell 440. More particularly, while the reaction chamber may be defined by inflator base 410, the initiator assembly 430, and the outer shell 440, a purpose of the inflator 400 is to confine the reaction to that portion of the reaction chamber 460 within an inner perimeter of the filter 405, and between the upper closure 450 and the inflator base 410. The upper closure 450 may fit tightly within an upper portion of the filter 405 to dispose the reactant in close proximity to the initiator assembly 430. The outer shell 440 comprises a plurality of apertures 425 disposed about and through the outer shell 440.

Figure 4B:
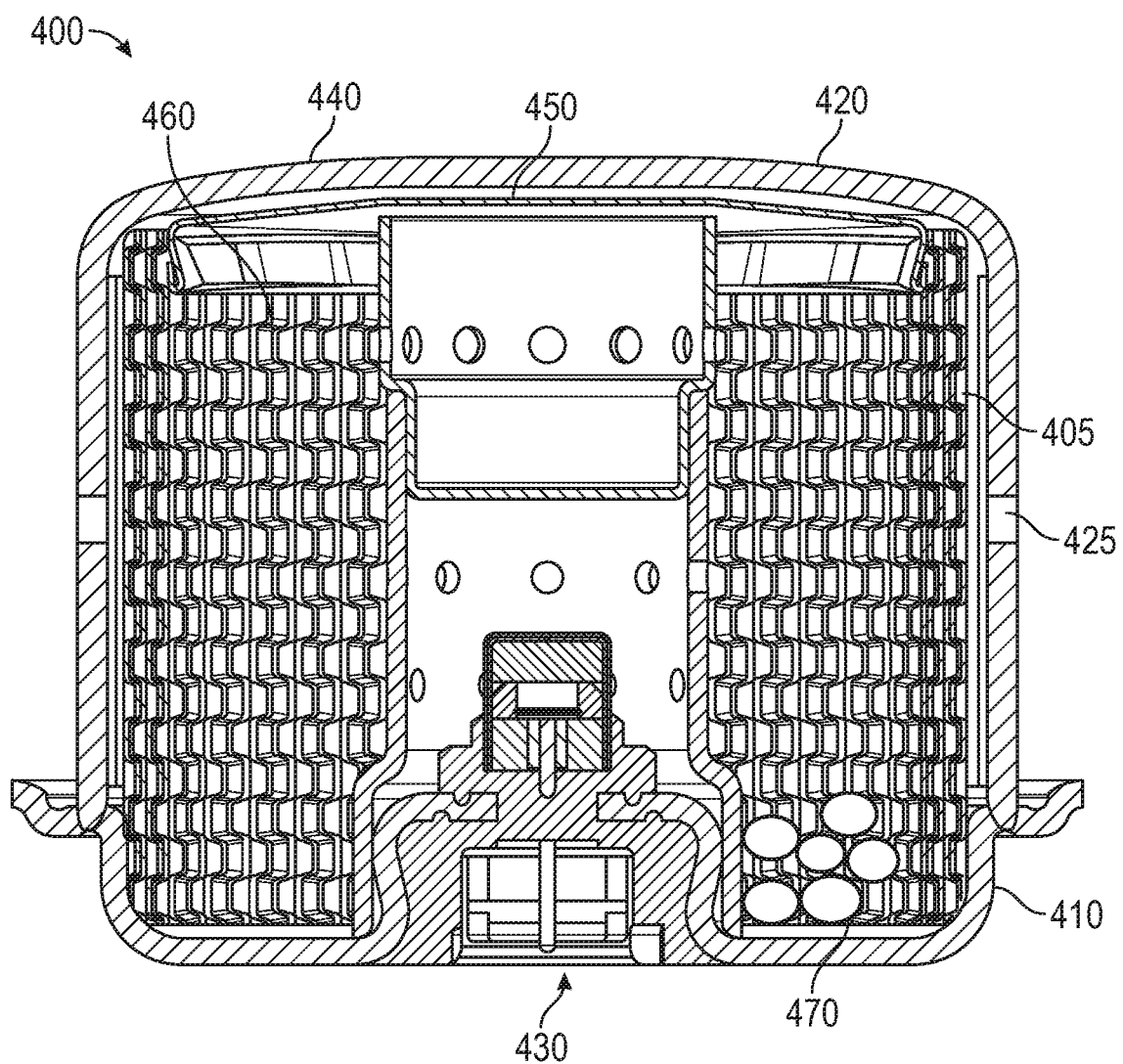
FIG. 4B is a side cross section view of the inflator of FIG. 4A in an assembled state.

FIG. 4B is a side cross section view of the inflator 400 of FIG. 4A in an assembled state. In the illustration of FIG. 4B, the initiator assembly 430 and the filter 405 have been coupled to the inflator base 410. Reactant (e.g. pyrotechnic material 470) may be added to the reaction chamber 460. For ease of illustration, only FIG. 4B illustrates the pyrotechnic material 470 disposed on only a small portion of one half of the reactant chamber 460. However, the amount of pyrotechnic material 470 and the location of the pyrotechnic materials within the reactant chamber 460 may be determined by a person of ordinary skill in the art. The upper closure 450 has been coupled at an upper portion of the filter 405, and the outer shell 440 has been coupled to the inflator base 410.

In response to a collision event, a sensor may generate a signal whereby the initiator assembly 430 may activate. Activation of the initiator assembly 430 may initiate a reaction among the combustible material within the reaction chamber 460 to produce rapidly expanding gases, such as nitrogen ($N_2$). The reaction may be a multiple stage reaction, during which various chemical components recombine and/or breakdown with an objective to produce the rapidly expanding gases and inert byproduct. The rapidly expanding gases (see 180 in FIGS. 1B, 1C, 280 in FIGS. 2B, 2C) may egress through the filter 405, then through apertures 425 disposed through the outer shell 440 for delivery to an inflatable airbag cushion. As discussed elsewhere herein, the exfiltrating rapidly expanding gases may entrain ICPP and/or PRB. The filter 405 may trap entrained ICPP and/or PRB whereby ICPP and PRB do not exit the inflator 400, or exit in a substantially reduced amount.

Throughout this specification, "couples" (including couples to, couples at, couples with, etc.) refers to any form of interaction between two or more entities, including mechanical, electrical, magnetic, electromagnetic, fluid, and thermal interaction. Two components may be coupled to each other even though they are not in direct contact with each other.

The terms "a" and "an" can be described as one but not limited to one. For example, although the disclosure may recite an inflator having an initiator, the disclosure also contemplates that the inflator can have more than one initiator.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. An inflator for an automotive safety device comprising:
a pyrotechnic material for producing a quantity of gas during deployment; and
a filter disposed about the pyrotechnic material,
wherein the filter comprises at least a first layer and a second layer,
wherein the first layer comprises a first plurality of projections arranged according to a pattern and each projection defining an aperture,
wherein the second layer comprises a second plurality of projections arranged according to the pattern and each projection defining an aperture; and
wherein a peak of each projection of the second plurality of projections of the second layer is nested with and contacts a corresponding valley of the first plurality of projections of the first layer in a nested configuration.

2. The inflator of claim 1, wherein each projection of the first layer comprises at least two faces and one of the at least two faces comprises the aperture and is oriented transverse to the first layer.

3. The inflator of claim 1, wherein the second layer is inverted to nest with the first layer.

4. The inflator of claim 3, wherein a peak of each projection of the first plurality of projections of the first layer nest within a corresponding valley of the plurality of projections of the second layer.

5. The inflator of claim 1, wherein the first plurality of projections of the first layer and the second plurality of projections of the second layer are spaced apart in the pattern according to Archimedean spiral length.

6. The inflator of claim 1, wherein the filter comprises a cylindrical shape that is formed by rolling the first layer and the second layer while nested together in the nested configuration.

7. The inflator of claim 6, wherein the pattern of the first layer and the pattern of the second layer vary by a function of an Archimedean spiral.

8. The inflator of claim 1, wherein the filter comprises three or more nested layers.

9. The inflator of claim 1, wherein in the nested configuration, the first plurality of projections of the first layer and their corresponding apertures and the second plurality of projections of the second layer and their corresponding apertures define a gas flow pathway that allows inflation gas to be filtered and escape the inflator, wherein the gas flow pathway comprises a tortuous path.

10. The inflator of claim 8, wherein the gas flow pathway comprises a plurality of radiused turns between 45 degrees and 90 degrees.

11. The inflator of claim 1, wherein the first layer is an inner layer and the second layer is an outer layer, wherein the apertures per inch of the first layer is greater than the apertures per inch of the second layer.

12. The inflator of claim 1, wherein the first layer and the second layer are formed from expanded metal.

13. A filter comprising:
a first layer comprising a first sheet of material and a first plurality of projections arranged according to a pattern in the first sheet of material, each projection defining an aperture through the first sheet of material;
a second layer comprising a second sheet of material and a second plurality of projections arranged according to the pattern in the second sheet of material, each projection defining an aperture through the second sheet of material;
wherein a peak of each projection of the second plurality of projections of the second layer is nested with and contacts a corresponding valley of the first plurality of projections of the first layer.

14. The filter of claim 13, wherein the first plurality of projections of the first layer and the second plurality of projections of the second layer are spaced apart in the pattern according to Archimedean spiral length.

15. The filter of claim 13, wherein the second layer is inverted to nest with the first layer and wherein a peak of each projection of the first plurality of projections of the first layer is nested with a corresponding valley of the second plurality of projections of the second layer.

16. The filter of claim 13, wherein the filter comprises a cylindrical shape that is formed by rolling the first layer and the second layer together.

17. The filter of claim 13, wherein the filter comprises three or more nested layers.

18. The filter of claim 13, wherein the first layer is an inner layer and the second layer is an outer layer, wherein the apertures per inch of the first layer is greater than the apertures per inch of the second layer.

19. The filter of claim 13, wherein the first layer and second layer are formed from expanded metal.

20. A method of manufacturing a filter comprising:
nesting a first layer with a second layer in a nested configuration, wherein the first layer and the second layer each comprise a plurality of projections arranged according to a pattern, each projection defining an aperture, wherein in the nested configuration the orientation of the second layer is inverted in relation to the orientation of the first layer, and wherein a peak of each projection of the second layer is nested with and contacts a corresponding valley of the first layer; and
rolling the first layer and the second layer in the nested configuration to form a filter cylinder.

* * * * *